March 25, 1958 J. T. BEARDWOOD III, ET AL 2,828,411

SIGNAL MIXER SYSTEM

Filed April 28, 1955 2 Sheets-Sheet 1

INVENTORS
JOSEPH T. BEARDWOOD
DAVID E. SUNSTEIN
CLAUDIUS T. McCOY

BY

ATTORNEY

SIGNAL MIXER SYSTEM

Filed April 28, 1955 2 Sheets-Sheet 2

INVENTORS
JOSEPH T. BEARDWOOD
DAVID E. SUNSTEIN
CLAUDIUS T. McCOY

BY [signature]
ATTORNEY 2,828,411

SIGNAL MIXER SYSTEM

Joseph T. Beardwood III, Philadelphia, Claudius T. McCoy, Upper Darby, and David E. Sunstein, Bala-Cynwyd, Pa., assignors to Philco Corporation, Philadelphia, Pa., a corporation of Pennsylvania Application April 28, 1955, Serial No. 504,996

13 Claims. (Cl. 250—20)

This invention relates to mixer circuits and more particularly to crystal mixer circuits for use in the ultrahigh and microwave frequency bands.

The overall noise figure of a superheterodyne receiver operating in the ultrahigh or microwave frequency bands depends to a large extent on the noise figure of the heterodyne converter employed in the receiver. The noise figure of the converter depends upon the efficiency of the conversion of radio frequency energy to intermediate frequency energy, and upon the amount of noise generated at the intermediate frequency terminals. This noise may be generated within the mixer element itself, or it may result from the conversion of noise signals from another source such as the local oscillator.

It is known that the noise figure of a heterodyne converter may be improved by suppressing noise signals generated within the local oscillator circuit and by recovering some of the energy in the image-frequency signals generated in the mixing process.

Attempts have been made to recover some of the energy in the image-frequency signal by providing reactive elements in the transmission line leading from the antenna to the mixing element, these reactive elements being so positioned that the image frequency signals are redirected to the mixer element where they are again heterodyned with the local oscillator signal to produce additional energy at the desired intermediate frequency. However, the reactive elements employed must not impede the signal frequency but must completely block the image frequency which may differ from the signal frequency by only a few megacycles. The reactive element usually takes the form of a high Q filter. Attempts have been made to suppress converted local oscillator noise by inserting very narrow band filters in the local oscillator line. However, receivers employing such filters are considered to be impractical for field use since the filters must be retuned for every change in the operating frequency of the receiver. Retuning the image termination filter and the local oscillator noise filter in a single receiver may require the services of a skilled technician for several days, even under ideal laboratory conditions.

Balanced mixer circuits have been constructed which eliminate converted local oscillator noise without requiring sharply tuned filters. This is accomplished by suppling the local oscillator signal to two mixer elements in 180° phase opposition, and then combining the outputs of the two mixer elements in such a manner that the intermediate frequency noise signal generated in one mixer element is cancelled by the intermediate frequency noise signal generated in the other mixer element. However, the balanced mixer design has little advantage over the single mixer design in an image terminated mixer. In an image terminated balanced mixer, no local oscillator noise filter is required but two image frequency termination filters are required, one for each of the two mixer elements of the balanced mixer.

Although the previously known types of image terminated mixers are impractical for field use, they have demonstrated that it is possible to obtain an improvement in the noise figure of a receiver of the order of 1 db by recovering at least a portion of energy normally lost in the image frequency signal.

Suppression of local oscillator noise and recovery of energy from the image frequency signal are but two of the many problems encountered in designing a mixer. In many instances it is essential that the mixer be so designed that the local oscillator signal and the image frequency signal are not radiated from the system antenna. This problem is made difficult by the fact that these signals are normally present in the transmission line leading to the antenna. Therefore the transmission line must be so arranged that these signals are attenuated without attenuating the received signals which differ from the local oscillator signal and the image frequency signal by only a few megacycles.

It is an object of the present invention to provide a mixer circuit which both eliminates converted oscillator noise and recovers a substantial portion of the energy present in the image frequency signals without employing tuned filters.

It is a further object of the invention to provide a mixer circuit in which the overall noise figure is improved without resort to tuned filters.

Still another object of the invention is to provide an improved mixer circuit in which suppression of local oscillator noise, recovery of energy from intermediate frequency signals and the elimination of the local oscillator signals from the system antenna is accomplished without the use of tuned filters.

Another object of the invention is to provide an improved mixer circuit suitable for field use and which has an overall noise figure equal or superior to that obtainable in the best laboratory receivers.

A further object of the present invention is to provide a receiver having the above enumerated advantages, and which will receive signals within a wide band of frequencies with no adjustment other than a change in the local oscillator frequency.

In general, these and other objects of the invention are accomplished in a mixer circuit which employs three or more mixer elements. The radio frequency signal to be converted, and the local oscillator signal, are supplied to each of the three mixer elements. However, instantaneous phase of the radio frequency signal with respect to the phase of the local oscillator signal is different for each of the three mixer elements. This results in the generation of polyphase intermediate frequency signals, there being one phase for each mixer element employed. The polyphase intermediate frequency signals are combined in appropriate network to produce a single phase intermediate frequency signal. The relative phases of the local oscillator signal and the radio frequency signal at each mixer element are selected to be such that the converted local oscillator noise is cancelled in the intermediate frequency signal combining network, and such that the net image frequency signal generated by the three crystals is equal to zero. In the preferred embodiments of the invention, the phase of the local oscillator signal at each of the mixer elements is such that the vector sum of the local oscillator signals reaching the antenna from the various mixer elements is equal to zero.

For a better understanding of the invention together with other and further objects thereof reference should now be made to the following detailed description which is to be read in conjunction with the accompanying drawings in which.

As mentioned above, the heterodyne mixer of the present invention may employ three or more mixing elements. Under certain circumstances which will become clear presently, the received energy may be divided in any desired ratio among these mixing elements before it is heterodyned with the local oscillator signal. However, the simplest form of the invention employs only three mixing elements which are identical in their electrical characteristics and which receive one third of the received energy each. Since this embodiment of the invention will suppress converted local oscillator noise, increase the efficiency of conversion of the received energy to intermediate frequency energy by properly terminating the image frequency energy, and suppress the radiation of the local oscillator signal and the image frequency signal, and since the three element mixer circuit illustrates many of the basic principles of the invention, it has been chosen for illustration in Fig. 1.

Figure 1:
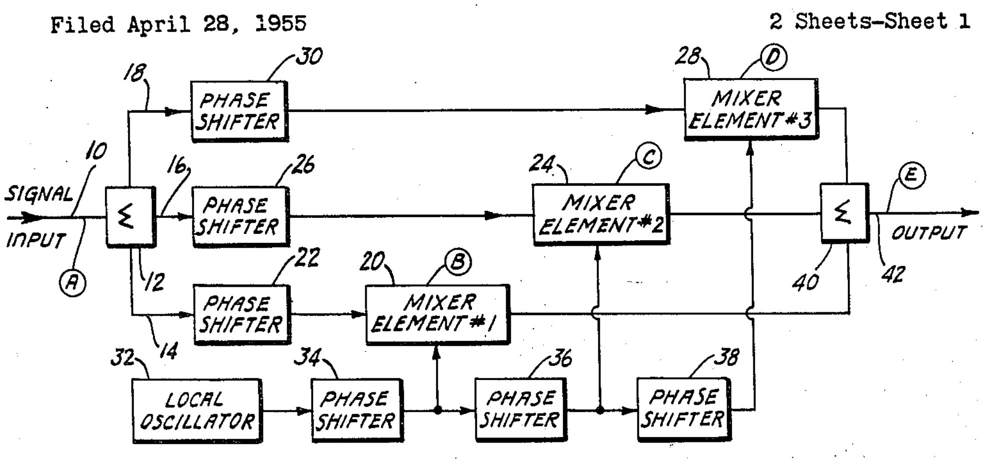
Fig. 1 is a block diagram of one preferred embodiment of the invention.
Figure 2A:
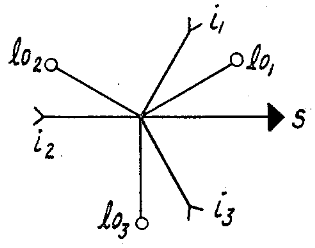
Figs. 2A to 2E are vector diagrams which illustrate the operation of the embodiment of Fig. 1.
Figure 2B:
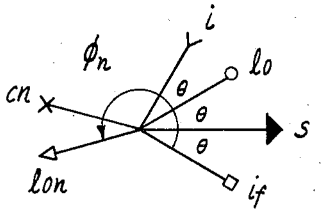
Figure 2C:
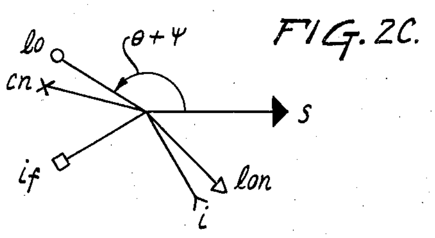
Figure 2D:
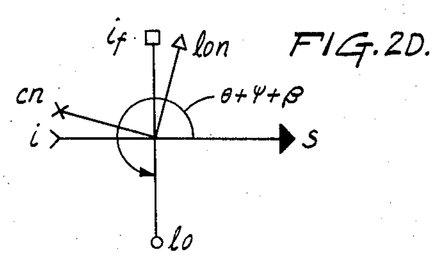
Figure 2E:
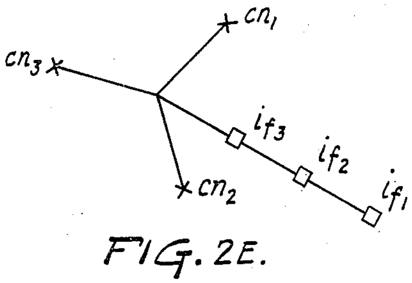

In the embodiment of Fig. 1 the signals to be heterodyned are supplied to the mixer circuit by way of conductor 10. These signals may be derived from an antenna or other similar source. Conductor 10 is the input lead of a combining circuit 12. In the preferred embodiments of the invention, combining circuit 12 may be simply the electrical junction of the input conductor 10 and three branch conductors 14, 16 and 18. In the discussion of Fig. 1 which follows, it will be assumed that combining circuit 12 is a bilateral circuit, that is, it will divide a signal appearing on conductor 10 among branch conductors 14, 16 and 18 and will combine signals on branch conductors 14, 16 and 18 to provide a signal at conductor 10. Branch conductor 14 is connected to mixer element 20 through a phase shifter 22. Similarly branch conductor 16 is connected to mixer element 24 through phase shifter 26, and branch conductor 18 is connected to mixer element 28 through phase shifter 30. Phase shifters 22, 26 and 30 may not appear as separate physical elements in an actual embodiment of the invention. In some instances no phase shift is required between branch conductors 14, 16 and 18 and mixer elements 20, 24 and 28, while in other instances conductors 14, 16 and 18 may be of sufficient length to provide any desired phase shift. However, if phase shifters are required, they may be of any type which is suitable for use at the frequency of the signal to be heterodyned. The nature of mixing elements 22, 24 and 28 will depend to a certain extent on the frequency of the signal to be heterodyned. Simple diode crystals are preferred in the ultrahigh and microwave frequency ranges.

The local oscillator signal is supplied to the three mixer elements from a source 32. Source 32 is connected to mixer element 20 through a phase shifter 34. The connection of source 32 to mixer element 22 is through phase shifters 34 and 36. The connection to mixer element 28 is through phase shifters 34, 36 and 38 in series.

The output of mixer elements 20, 24 and 28 are supplied to a second combining circuit 40. The output of combining circuit 40, which appears at conductor 42, is the desired intermediate frequency signal.

Before describing in detail the operation of the system of Fig. 1, the operation of a single mixer element will be reviewed. If a received radio frequency signal, having a frequency of say 9,405 megacycles, is supplied to a mixer element which is also supplied with a local oscillator signal having a frequency of 9,375 megacycles, an intermediate frequency signal at 30 megacycles is produced. Approximately one-half of the energy in the radio frequency signal is expended in generating the 30 megacycle intermediate frequency signal while the other half is expended in generating a signal at the image frequency of 9,345 megacycles. This image frequency signal is an unwanted by-product of the mixing process. The image frequency signal generated within the mixer should not be confused with the signal of the same frequency which may be picked up by a receiving antenna. This latter signal will heterodyne with the local oscillator signal to produce an interfering signal at the intermediate frequency, but it does not affect the amplitude of the intermediate frequency signal derived from the desired radio frequency signal. Some of the energy lost in the generation of the image frequency signal may be recovered by heterodyning the image frequency signal with the local oscillator signal to produce a second intermediate frequency signal at 30 megacycles which has the same information content as the intermediate frequency signal derived from heterodyning the received radio frequency signal with the local oscillator signal.

A second aspect of the mixing process relates to the generation of noise at the intermediate frequency. A typical local oscillator signal includes noise frequency signals which may extend for several megacycles on either side of the desired local oscillator frequency. The noise frequency signals which are separated from the local oscillator signal by the intermediate frequency will heterodyne with the local oscillator signal in the mixer element to produce noise signals at the intermediate frequency.

The operation of the system of Fig. 1 will now be explained with reference to the vector diagrams of Figs. 2A to 2E. The capital letters A through E in Fig. 1 designate the points in the circuit of Fig. 1 at which the various signals have the phases represented by the vector diagrams 2A through 2E, respectively. In the vector diagrams of Figs. 2A through 2E, the input signal is represented by the vector ——⊳$_s$ at the zero phase position. It is assumed that the phase shifters 22, 26 and 30 each provide a phase shift equal to an integral number of cycles of the input signal. For simplicity it will be assumed that this phase shift is equal to zero. The local oscillator signal is represented by the vector ——○$_{lo}$. The subscripts 1, 2 and 3 designate the local oscillator signal at mixer elements 20, 24 and 28, respectively. The other vectors shown in the drawings represent the other signals as follows:

——<$_i$ —image frequency signal

——▷$_{lon}$—local oscillator noise

——×$_{cn}$ —converted local oscillator noise

It should be noted that the vectors shown in Figs. 2A through 2E represent signals of different frequency. Therefore the diagrams represent only the phase relationships of the signals at particular instants. However, since it is customary to employ such diagrams in the description of the operation of mixer circuits, it is believed that no ambiguity will result.

The local oscillator energy arrives at mixer element 20 with arbitrary phase $\theta$, controlled by phase shifter 34. Hence the phases of the various signals at the mixer element 20 are as follows:

$$\text{phase of input signal } \phi_s=0 \quad (1a)$$

$$\text{phase of local oscillator signal } \phi_{lo(1)}=\theta \quad (1b)$$

$$\text{phase of image signal } \phi_{i(1)}=2\theta \quad (1c)$$

$$\text{phase of I. F. signal } \phi_{if(1)}=-\theta \quad (1d)$$

$$\text{phase of converted local oscillator noise } \phi_{cn(1)}=\phi_n-\theta \quad (1e)$$

where $\phi_n$ is the phase of the local oscillator noise.

Taking into account a phase shift $\psi$ in phase shifter 36, the phases of the various signals at mixer element 24 are as follows:

$$\phi_s=0 \quad (2a)$$
$$\phi_{lo(2)}=\theta+\psi \quad (2b)$$
$$\phi_{i(2)}=2(\theta+\psi) \quad (2c)$$
$$\phi_{if(2)}=-(\theta+\psi) \quad (2d)$$
$$\phi_{cn(2)}=(\phi_{n1}+\psi)-(\theta+\psi)=\phi_n-\theta \quad (2e)$$

Similarly at mixer element 28, assuming a phase shift $\beta$ in phase shifter 38, $$\phi_s=0 \quad (3a)$$
$$\phi_{lo(3)}=\theta+\psi+\beta \quad (3b)$$
$$\phi_{i(3)}=2(\theta+\psi+\beta) \quad (3c)$$
$$\phi_{if(d)}=-(\theta+\psi+\beta) \quad (3d)$$
$$\phi_{cn(3)}=(\phi_n+\psi+\beta)-(\theta+\psi+\beta)=\phi_n-\theta \quad (3e)$$

Assuming that the magnitudes of the image signals are the same for all three mixer elements, the vector sum of the image signals will be zero at conductor 10 if $$(\phi_{i(1)}-\phi_{i(3)})=(\phi_{i(2)}-\phi_{i(1)})=(\phi_{i(3)}-\phi_{i(2)}) \quad (4)$$

Combining Equations 1, 2, 3 and 4, $$2(\theta+\psi)-2\theta=2(\theta+\psi+\beta)-2(\theta+\psi)$$

from which is found:

$$\psi=\beta \quad (5)$$

In terms of the block diagram of Fig. 1, phase shifter 36 must provide the same phase shift as phase shifter 38. Substituting Equation 5 in Equation 4 it can be seen that $$(\phi_{i(1)}-\phi_{i(3)})+(\phi_{i(2)}-\phi_{i(1)})+(\phi_{i(3)}-\phi_{i(2)})=2m \quad (6)$$

where $m$ is any integer.

Since there are three image vectors and the angles between any two adjacent vectors are equal, it follows that $$3(2\psi)=2m\pi \quad (7)$$

or $$\psi=\frac{m\pi}{3} \quad (8)$$

Therefore the phase shifts provided by phase shifters 36 and 38 of Fig. 1 must be equal, and equal to an integral multiple of a third period of the local oscillator signal.

Under the conditions assumed above—namely that the received energy is divided equally among the three mixing elements 20, 24 and 28—the magnitudes of the three intermediate frequency signals generated respectively by the three mixer elements will all be equal. Similarly the magnitudes of the converted noise signals generated at the three mixer elements will all be equal.

Substituting Equation 5 in Equations 1*d*, 2*d*, and 3*d*, it will be seen that:

$$\phi_{if(1)}=-\theta \quad (9a)$$
$$\phi_{if(2)}=-\theta+\psi) \quad (9b)$$
$$\phi_{if(3)}=-(\theta+2\psi) \quad (9c)$$

Therefore, for the proper addition of the I. F. signals, the phase of the I. F. energy at mixer element 24 must be shifted by the amount $\psi$ in combining circuit 40, and the phase of the I. F. energy at mixer element 28 must be shifted in phase by an amount $2\psi$.

Taking these phase shifts in combining circuit 40 into account, it will be seen that the phases of the converted local oscillator noise signals appearing at the output of combining circuit 40 will be:

$$\phi_{cn(1)}=\phi_n-\theta \quad (10a)$$
$$\phi_{cn(2)}=\phi_n-\theta+\psi \quad (10b)$$
$$\phi_{cn(3)}=\phi_n-\theta+2\psi \quad (10c)$$

In order to have complete cancellation of converted local oscillator noise at the output of combining circuit 40, it is necessary that:

$$(\phi_{cn(1)}-\phi_{cn(3)})=(\phi_{cn(2)}-\phi_{cn(1)})=(\phi_{cn(3)}-\phi_{cn(2)}) \quad (11)$$

Substituting from Equation 10 it will be seen that:

$$-2\psi=\psi^{+}-2a\pi \quad (12)$$

where $a$ is an integer, or:

$$\psi=\frac{2a\pi}{3} \quad (13)$$

A comparison of Equation 8 with Equation 13 will show that any solution of Equation 13 will satisfy Equation 8, but that the converse is not true.

Therefore complete suppression of the image frequently signal at conductor 10, and complete suppression of the converted local oscillator noise at the output of combining circuit 40, requires that the phase shifts provided by phase shifters 36 and 38 be an even integral number of third periods of the local oscillator signal.

It should be noted that there is no restriction placed on the phase shift provided by phase shifter 34. Therefore this phase shift may be of any convenient value, including zero.

Since the phase difference between the local oscillator signals at any two mixing elements is $\psi=2\pi/3$, and the magnitude of the local oscillator signal is the same at all mixer elements, there will be complete cancellation of the local oscillator energy at input conductor 10.

The above explanation of the operation of the circuit of Fig. 1 assumes that the phase shifts provided by phase shifters 22, 26 and 30 are equal to zero. However, it can be seen that these phase shifts may have any value provided that they are equal to each other. Therefore it is possible to select these phase shifts so that the impedance of combining circuit 12 appears at the image terminals of mixer elements 20, 24 and 28 as the optimum termination to provide maximum conversion of the received signal energy to energy at the intermediate frequency. Therefore the heterodyne mixer circuit of Fig. 1 properly terminates the image frequency energy generated in the mixing process, suppresses converted local oscillator noise and prevents the radiation of the local oscillator signal and the image frequency signal from the antenna. As pointed out above, the circuit of Fig. 1 employs no tuned filters. It has been found in practice that a variation of 10 percent in the phase shifts produced by phase shifters 22, 26, 30, 36 and 38 will not materially degrade the operation of the mixer circuit. Therefore the limits on the frequency band, within which the mixer circuit of Fig. 1 may be employed without resetting the phase shifters, is determined mainly by the characteristics of the phase shifters. In a microwave or ultrahigh frequency mixer circuit, one preferred form of phase shifter is a short section of transmission line. A phase shifter of this type will permit approximately a 10 percent change in the frequency of operation of the mixer without readjusting the phase shifters. Furthermore the adjustment of the phase shifters to permit operation outside this 10 percent band is far simpler and easier that retuning the tuned filters of the prior art. It is to be understood that returning of the local oscillator will be necessary for each change in the frequency of the received signal in order to maintain the proper intermediate frequency. However, in many receivers the retuning of the local oscillator circuit will be accomplished automatically by a suitable automatic frequency control circuit.

The circuit shown in Fig. 1 employs three mixing elements with equal division of the received signal and the local oscillator signals among the three mixer elements. However, this circuit is merely one preferred embodiment of the invention. In general, the heterodyne mixer circuit of the present invention employs $n$ mixer elements, where $n$ is any integer greater than two. If there is equal division of received signal energy and local oscillator energy, and if all mixer elements have identical electrical characteristics, Equation 8 becomes:

$$\psi=\frac{m\pi}{n} \quad (14)$$

and Equation 13 becomes:

$$\psi=\frac{2a\pi}{n} \quad (15)$$

In general it will be found that one additional function may be performed for each mixer element added. For example, if a fourth mixer element is added, it is possible to suppress the harmonic image signal. The harmonic image signal is the signal resulting from the heterodyning of the received signal with the second harmonic of the local oscillator signal. It would be possible to suppress the harmonic image in a three element mixer circuit at the sacrifice of one of the functions normally performed by the three element mixer circuit. In general, suppression of the harmonic image is not important at microwave frequencies. However, at ultrahigh frequencies and below, suppression of the harmonic image is as important as the suppression of the image signal and converted local oscillator noise. If the division of the received energy among the various mixer elements is not uniform, the phases of the received signal and the local signal at the various mixer elements may be readjusted to provide the desired vector additions of the signals. However, operation of the mixer in this manner may not be as efficient nor as simple as the manner of operation described in detail above.

Figure 3:
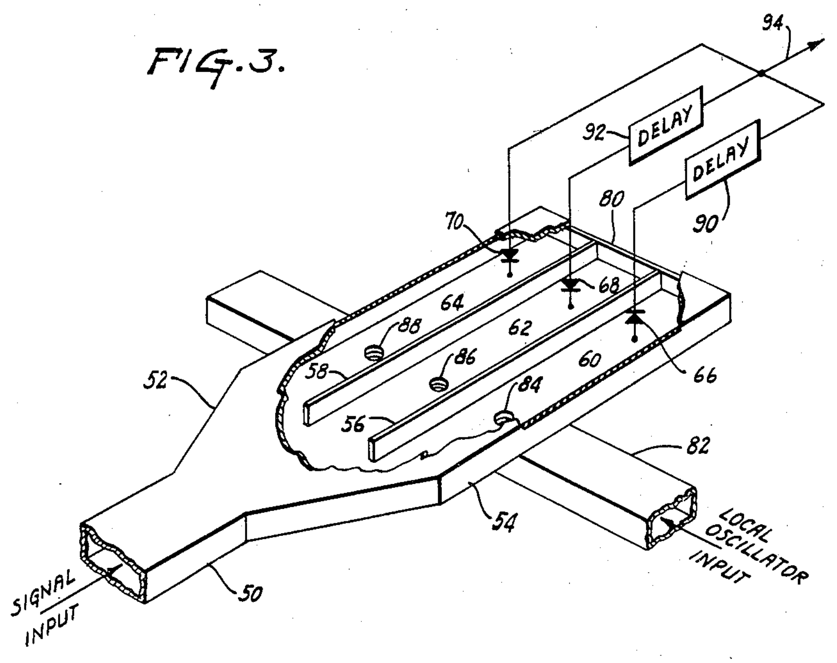
Fig. 3 is an isometric view of an embodiment of the invention arranged for operation at microwave frequencies.
Figure 4:
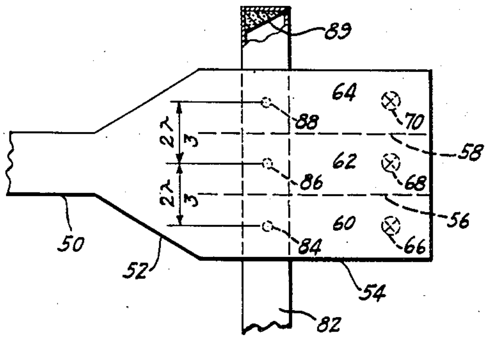
Fig. 4 is a plan view of the waveguide portion of Fig. 3.

Figs. 3 and 4 show a preferred form of the mixer circuit of Fig. 1 arranged for operation at microwave frequencies. Waveguide 50 is the waveguide leading from the receiving antenna to the mixer circuit. Waveguide 50 is gradually flared at 52 to approximately three times its normally longer cross-sectional dimension. The wider portion 54 is divided by two septa 56 and 58 to provide three waveguide sections 60, 62 and 64, all of equal length and all capable of propagating energy at the frequency of the received signal. The dimensions of waveguide sections 60, 62 and 64 are such that these three sections in parallel match the characteristic impedance of waveguide 50. Three crystal mixer elements 66, 68 and 70 are disposed in waveguides 60, 62 and 64, respectively. The mixer elements are so positioned that the received energy reaches all three elements in the same phase. If the flared portion 52 is symmetrical with respect to the longitudinal axis of waveguide 50, the mixer elements may be located in a straight line which is perpendicular to the longitudinal axis of waveguide 50. Preferably mixer elements 66, 68 and 70 have identical electrical characteristics. However, for reasons which will appear presently, it is desirable that mixer element 66 provide an intermediate frequency signal which is reversed in phase with respect to the signals produced by mixer elements 68 and 70. This result can be accomplished by connecting one terminal of each of mixer elements 68 and 70 to the waveguide structure in the usual manner, and connecting the opposite terminal of mixer element 66 to the waveguide structure. Some forms of crystal holders for supporting mixer crystals within the waveguide permit crystals to be placed in the holder in either one of two opposite orientations. If crystal holders of this type are employed, the reversed connection can be made simply by reversing the physical position of mixer element 66 within its holder. The ends of waveguide portions 60, 62 and 64 are terminated by a conductive wall 80. The spacing between the mixer elements 66, 68 and 70 and the end wall 80 is selected to be the proper value to match the mixer elements to the various waveguide sections.

The local oscillator signal is supplied to waveguide 82 which communicates with waveguide sections 60, 62 and 64 through coupling holes 84, 86 and 88. The spacing between coupling holes 84 and 86 and between holes 86 and 88 is such as to provide the desired phase differences in the local oscillator signals at the three mixing elements. These phase differences may be controlled by suitable phasing devices (not shown) in waveguide 82 if necessary. The end of waveguide 82 is terminated in its characteristic impedance by resistive strip 89 to prevent reflection of the portion of the local oscillator signal not transferred to waveguide portions 60, 62 and 64.

In the mixer circuit of Figs. 3 and 4, tapered section 52 corresponds to the combining circuit 12 of Fig. 1. The lengths of the waveguide sections 60, 62 and 64, from mixer elements 66, 68 and 70 to the ends of septa 56 and 58 at section 52, are such as to reflect the optimum impedance to the three mixer elements at the image frequency, thereby to provide maximum conversion of the received radio frequency signal to intermediate frequency energy. It should be noted that, although each of the three waveguides 60, 62 and 64 is terminated by its characteristic impedance at section 52, the cancellation of the image signals at section 52 resulting from the proper phasing of the generated image signals at mixer elements 66, 68 and 70 causes the junction of each waveguide sections 60, 62 and 64 with section 52 to appear as a short circuit for the image frequency signal. It is this apparent short circuit that is reflected as the optimum impedance at the image terminals of the mixer elements.

The I. F. signal from mixer element 66 is delayed by the equivalent of 60° in delay means 90. Therefore this signal is shifted 180° by the reversal of mixer element 66, and an additional 60° by delay means 90, for a total of 240°. The I. F. signal from mixer element 68 is delayed an equivalent of 120° by delay means 92. Delay means 90 and 92 may be appropriate lengths of coaxial cable. The reversal of mixer element 66 reduces by a factor of four the delay that would otherwise be required in delay means 90. The I. F. signals from the outputs of delay means 90 and 92 and mixer element 70, all of which are in phase, are combined at 96 to provide the desired output signal.

The operation of the system of Figs. 3 and 4 is similar to that of Fig. 1. The received energy from waveguide 50 divides equally and in phase among mixer elements 66, 68 and 70. The local oscillator signal is supplied to the local oscillator waveguide 82. The local oscillator signal is coupled to waveguide sections 60, 62 and 64 through coupling apertures 84, 86 and 88, respectively, and reaches mixer elements 66, 68 and 70 with the required $$\frac{2a\pi}{3}$$

phasing between signals at adjacent mixer elements. The output combining network, including delay means 90 and 92, shifts the phases of the I. F. signals to bring them into phase at output line 94. At the same time the output combining network shifts the phases of the converted local oscillator noise signals to place them 120° out of phase at output line 94 so that there is complete cancellation of converted noise signals in output line 94.

The phases of the local oscillator signals reaching waveguide 50 from coupling apertures 84, 86 and 88 are such that complete cancellation of the local oscillator signal results. Directional couplers could be employed in place of the simple coupling holes 84, 86 and 88, but this is usually made unnecessary by the phasing of the local oscillator signals to cause cancellation.

As mentioned earlier, the length of waveguide sections 60, 62 and 64 is so selected that the image frequency signal is properly terminated to provide maximum generation of intermediate frequency signal. The $$\frac{2a\pi}{3}$$

phase difference between the image frequency signals at the three mixers results in complete cancellation of the image frequency signal in waveguide 50. As suggested above, the mixer circuit of Figs. 3 and 4 give satisfactory operation over a band width equal to approximately 10 percent of the frequency of the received signal without alteration of any of the components. This range can be extended by placing adjustable phasing elements in the local oscillator waveguide 82 between coupling holes 84 and 86 and between holes 86 and 88. Similar phasing elements should be provided in waveguides 60, 62 and 64 to insure that the optimum impedance always appears at the image terminals of the mixer elements.

Figure 5:
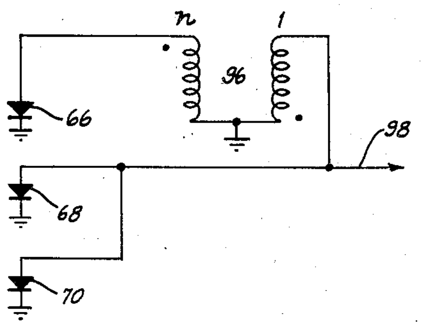
Fig. 5 is a wiring diagram of a modified form of output combining circuit.

The combining network of Fig. 5 accomplishes the same result as the combining network shown in Fig. 3 without the use of delay lines. The mixer elements in Fig. 5 correspond to the mixer elements of Fig. 3. The signals from mixer elements 68 and 70 are added linearly and supplied to the secondary of a transformer 96 which has a turns ratio of $n$ to 1, where $n$ has the value of 2 or 0.5 depending on whether the impedance seen by mixer elements is a high impedance or a low impedance. The combination of the two intermediate frequency signals, which are 120° apart in phase, results in a single signal which is opposite in phase to the intermediate frequency signal from mixer element 66 but of the same magnitude. However, the converted noise signal is twice the amplitude of the corresponding signal from either mixing element alone, and this signal is in phase with the converted noise signal from mixing element 66. The signal from mixer element 66 is supplied to the primary of transformer 96. The transformer 96 inverts the signal from mixing element 66 and increases its effective amplitude by a factor of two. This inverted signal is combined with the combined signal from mixer elements 68 and 70 at output line 98. The converted noise signals, supplied by the secondary of transformer 96 and the mixer elements 68 and 70, respectively, will be equal in amplitude but 180° out of phase so complete cancellation will result. The intermediate frequency signal from the secondary of transformer 96 will be twice the amplitude of the corresponding signal from mixer elements 68 and 70 but in phase therewith. Therefore the combining circuit shown in Fig. 5 will provide an output intermediate frequency signal on line 98 which has an amplitude three times that of the signal from any one of the three mixer elements, and this output signal is completely free of converted local oscillator noise.

The combining circuit shown in Fig. 5 has the advantage that no delay lines are employed. The combining circuit of Fig. 3 is based on the assumption that there will be little, if any, variation in the local oscillator noise from cycle to cycle. This assumption is not valid for purely random noise. The combining circuit of Fig. 5 compares identical cycles of the noise so variations in the character of the noise from cycle to cycle will not affect the degree of cancallation of the noise.

Figure 6:
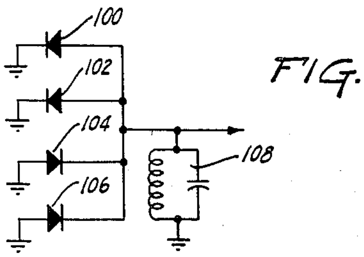
Fig. 6 is a diagram of a form of combining network including four mixer elements.

Fig. 6 illustrates a combining network for a mixer circuit employing four mixer elements 100, 102, 104 and 106. In a waveguide mixer circuit of the type shown in Fig. 3 the mixer elements 100 and 102 are placed in the waveguide sections with one orientation and the mixer elements 104 and 106 are placed with the opposite orientation. In this arrangement one terminal of each of the mixer elements is grounded. The other terminal of each of the mixer elements is connected directly to the intermediate frequency load 108. No transformers or phase changing networks are necessary.

The circuit of Fig. 6 will combine the various signals in the following manner. The converted local oscillator noise signals at mixer element 102 will be in phase with the corresponding signal at mixer element 100. The converted local oscillator noise signal at mixer elements 104 and 106 will be 180° out of phase with the corresponding signal at mixer element 100 owing to the reversal of mixer elements 104 and 106. Therefore the direct summation of the converted local oscillator noise signals from the four mixer elements will effect complete cancellation of the converted local oscillator noise signals.

If the four mixer elements shown in Fig. 6 all had the orientation, the intermediate frequency signals generated thereby would be in phase quadrature and the direct summation of these signals would result in a zero output signal at the intermediate frequency. However, the reversal of mixer elements 104 and 106 causes the signal from mixer element 104 to be in phase with the corresponding signal from mixer element 100 and also causes the signal from mixer element 106 to be in phase with the corresponding signal from mixer element 102. Therefore, the direct summation of the intermediate frequency signals across load 108 results in an intermediate frequency signal which is 45° out of phase with the intermediate frequency signals at mixer elements 100 and 102. The amplitude of the combined signal will be $2\sqrt{2}$ times that of the intermediate frequency signal supplied by any one mixer element.

It will be understood that the circuit of Fig. 6 is to be used with a waveguide structure having four branches, one for each of mixer elements 100, 102, 104 and 106 and that the spacing of the coupling apertures in the local oscillator waveguide will be selected to give the proper phasing of the local oscillator signal at the four mixer elements.

It is believed that the advantages to be derived from the use of four mixer elements with a direct connection of all mixer elements to the load will be obvious to anyone skilled in the design of mixer circuits. The use of four mixer elements, connected as shown in Fig. 6, avoids the use of intermediate frequency transformers and phase changing networks which may be sources of difficulty in the design of mixer circuits employing only three mixer elements.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What is claimed is:

1. In combination with a source of signals to be heterodyned and a source of local oscillator signal, a heterodyne mixer circuit including $n$ mixer elements where $n$ is an integer greater than two, means for supplying said signals to be heterodyned to said $n$ mixer elements in a first phase relationship, means for supplying said local oscillator signal to said mixer elements so that the instantaneous phase relationship between said local oscillator signal and said radio frequency signal increases progressively by equal increments of $$\frac{2a\pi}{n}$$

radians for successive mixer elements, where $a$ is an integer, thereby to cause the intermediate frequency signals generated by said $n$ mixer elements to have a different relative phase relationship than the converted local oscillator noise signals generated by said mixer elements, and a network associated with said $n$ mixer elements for combining the signals generated thereby to provide substantially complete cancellation of said converted local oscillator noise signal and an uncancelled intermediate frequency signal.

2. In combination with a source of signals to be heterodyned and a source of local oscillator signal, a heterodyne mixer circuit including $n$ mixer elements where $n$ is an integer greater than two, means for dividing said signals to be heterodyned among said $n$ mixer elements equally and in phase, the position of said signal dividing means with respect to said mixer elements being such as to reflect an optimum impedance to said mixer elements at the frequency of generated image signals, means for supplying said local oscillator signal to said mixer elements with a progressive equal phase shift of $$\frac{2a\pi}{n}$$

radians between successive mixer elements, where $a$ is an integer, means associated with said $n$ mixer elements for combining the intermediate frequency signals generated by said $n$ mixer elements to produce an output intermediate frequency signal, and for simultaneously combining the converted local oscillator noise signals generated by said $n$ mixer elements to produce substantially complete cancellation of said converted local oscillator noise signals.

3. In combination with a source of signals to be heterodyned and a source of local oscillator signal, a heterodyne mixer circuit including $n$ mixer elements where $n$ is an integer greater than two, means for dividing said signal to be heterodyned among said $n$ mixer elements equally and in phase, the position of said signal dividing means with respect to said mixer elements being such as to reflect an optimum impedance to said mixer elements at the frequency of generated image signals, means for supplying said local oscillator signal to said mixer elements with a progressive, equal phase shift of $$\frac{2a\pi}{n}$$

radians between successive mixer elements, where $a$ is an integer, thereby to cause the converted local oscillator noise signals generated by said $n$ mixer elements to be in phase, and the intermediate frequency signals generated by said $n$ mixer elements to differ in phase by $$\frac{2a\pi}{n}$$

radians, means for shifting the phase of the signals generated by each of said $n$ mixer elements to cause said intermediate frequency signals to be in phase, said phase shifting means thereby causing said converted local oscillator noise signals to differ in phase by $$\frac{2a\pi}{n}$$

radians, and means for additively combining said phase shifted signals thereby to provide combined output signal at the intermediate frequency and substantially complete cancellation of said converted local oscillator noise signal.

4. In combination with a source of signals to be heterodyned and a source of local oscillator signal, a heterodyne mixer circuit including three mixer elements, means for supplying said signals to be heterodyned to said three mixer elements equally and in phase, means included in said signal supplying means for reflecting an optimum impedance to said mixer elements at the frequency of generated image signals, means for supplying said local oscillator signal to said three mixer elements, said last-mentioned supplying means being arranged to cause the phase of the local oscillator signal at the second of said three mixer elements to differ in phase from the local oscillator signal at the first mixer element by $$\frac{2a\pi}{3}$$

radians, where $a$ is an integer, said supplying means being further arranged to cause the phase difference between the local oscillator signals supplied to said second and the third mixer elements to be equal to said phase difference of the local oscillator signals supplied to said first and second mixer elements, means associated with said three mixer elements for terminating image frequency signals generated by said mixer elements to provide maximum conversion of said signals to be heterodyned to intermediate frequency signals, and means associated with said three mixer elements for combining the polyphase intermediate frequency signals generated thereby to a single phase intermediate frequency signal, said combining means being arranged to provide substantially complete cancellation of converted local oscillator noise signals generated by said mixer elements.

5. A heterodyne mixer circuit as recited in claim 4 wherein said combining means comprises means for shifting the phase of the signals generated by one of said mixer elements by substantially one-third of a period, means for shifting the phase of the signals generated by another of said mixer elements by substantially two-thirds of a period, and means for additively combining said two phase shifted signals and the signals generated by the remaining mixer element.

6. A heterodyne mixer circuit as recited in claim 4 wherein said combining means comprises means for additively combining the signals generated by two of said mixer elements, means for inverting said combined signals, means for altering the amplitude of said combined signals by a factor of two, and means for additively combining said signals of altered amplitude and the signals generated by the third of said three mixer elements.

7. A heterodyne mixer circuit comprising a first waveguide to which signals to be heterodyned may be supplied, first, second and third waveguide sections, each having an open end and a closed end, said second waveguide section having its narrower walls in common with narrower walls of said first and said third waveguide sections, a tapered waveguide section joining the open ends of said three waveguide sections to said first waveguide, first, second and third mixer elements disposed in said first, second and third waveguide sections, respectively, said three mixer elements being positioned so as to receive energy in the same phase from said first waveguide, a second waveguide to which local oscillator signals may be supplied, said second waveguide being coupled to said first, second and third waveguide sections, respectively, by first, second and third coupling apertures, the electrical length of said second waveguide between adjacent coupling apertures being substantially equal to $$\frac{2\pi}{3}$$

radians, said coupling apertures being positioned substantially equidistant from any point on the longitudinal axis of said first waveguide, the spacing of said mixer elements from said tapered waveguide section being such as to provide optimum termination for image frequency signals generated by said mixer elements, and means associated with said mixer elements for combining the signals generated by said mixer elements, said combining means being arranged to cause the converted local oscillator noise signal generated by one of said mixer elements to be equal in magnitude and opposite in phase to the resultant signal representing the converted local oscillator noise signals generated by the other of said two mixer elements, whereby substantially complete cancellation of said converted local oscillator noise signals results.

8. A heterodyne mixer circuit comprising a first waveguide structure to which the signal to be heterodyned may be supplied, said waveguide structure having a longer transverse dimension at least equal to $w$ in a first region, and at least equal to $n$ times $w$ in a second region, where $w$ is the minimum transverse dimension which will permit said signal to be heterodyned to be propagated in a waveguide and $n$ is an integer greater than two, said waveguide structure gradually increasing in its longer transverse dimension in a third region intermediate said first and said second regions, a plurality of septa disposed in said second region and parallel to the narrower walls thereof, thereby to form $n$ substantially identical waveguide sections, a mixer element disposed in each of said $n$ waveguide sections, said mixer elements being positioned so as to be energized in phase by signals introduced into said first region, the spacing between said mixer elements and the ends of said septa at said third region being such as to provide optimum termination of generated image frequency signals, a second waveguide coupled to each of said $n$ waveguide sections by a separate coupling aperture, said second waveguide being so constructed and arranged that signals introduced therein energize said mixer elements with a constant phase difference between mixer elements, said phase difference being equal to $$\frac{2a\pi}{n}$$

radians, where $a$ is an integer, and means associated with said mixer elements for combining the output signals therefrom, said combining means being constructed and arranged to provide a single phase intermediate frequency signal and substantially complete cancellation of converted local oscillator noise signals generated by said mixer elements.

9. A heterodyne mixer circuit comprising first, second, third and fourth substantially identical waveguide sections, a mixer element disposed in each of said waveguide sections, the mixer elements in said third and fourth sections having an orientation opposite to that of said mixer elements in said first and second sections, means for supplying said signal to be heterodyned equally to said four waveguide sections, means for supplying a local oscillator signal to each of said waveguide sections, the local oscillator signal at each of the mixer elements being equal in amplitude to, but in phase quadrature with, the local oscillator signals at the other of said mixer elements, an intermediate frequency load impedance, and means connecting said mixer elements in parallel across said load impedance.

10. A heterodyne mixer circuit comprising first, second, third and fourth substantially identical waveguide sections, a diode mixer element disposed in each of said waveguide sections so as to be energized by electrical energy propagated therein, the mixer elements in said third and fourth waveguide sections having an orientation opposite to that of said mixer elements in said first and second sections, a fifth waveguide section to which the signal to be heterodyned may be supplied, a transition section connecting said fifth waveguide section to said first-mentioned four waveguide sections in parallel, said waveguide sections being so dimensioned that said first-mentioned four waveguides in parallel have an impedance substantially equal to the characteristic impedance of said fifth section, a sixth waveguide section to which local oscillator signals may be supplied, said sixth waveguide section being coupled to each of said first, second, third and fourth waveguide sections, the electrical spacing from the point of coupling to the mixer element being substantially the same for all four waveguide sections, said sixth waveguide section being so arranged that the local oscillator signal at each of the four points of coupling differs in phase by $$\frac{\pi}{2}$$

radians from the signals at the three other points of coupling, the spacing of said mixer elements from said transition section being such as to provide optimum termination for image frequency signals generated by said mixer elements, an intermediate frequency load impedance, and means connecting said mixer elements in parallel across said load impedance.

11. In combination with a source of signals to be heterodyned and a source of local oscillator signal, a heterodyne mixer circuit including $n$ mixer elements where $n$ is an integer greater than 2, means for dividing said signals to be heterodyned among said $n$ mixer elements equally and in phase, means for supplying said local oscillator signal to said mixer elements with a progressive equal phase shift of $$\frac{2a\pi}{n}$$

radians between successive mixer elements, where $a$ is an integer, means associated with said $n$ mixer elements for combining the intermediate frequency signals generated by said $n$ mixer elements to produce an output intermediate frequency signal and for simultaneously combining the converted local oscillator noise signals generated by said $n$ mixer elements to produce substantially complete cancellation of said converted local oscillator noise signals.

12. In combination with a source of signals to be heterodyned and a source of local oscillator signal, a heterodyne mixer circuit including $n$ mixer elements where $n$ is an integer greater than 2, means for supplying said signals to be heterodyned to said $n$ mixer elements equally in a first phase relationship, means for supplying said local oscillator signal to said mixer elements so that the instantaneous phase relationship between said local oscillator signal and said radio frequency signal increases progressively by equal increments of $$\frac{2a\pi}{n}$$

radians for successive mixer elements, where $a$ is an integer, thereby to cause the intermediate frequency signals generated by said $n$ mixer elements to have a different relative phase relationship than the converted local oscillator noise signals generated by said mixer elements, and a network associated with said $n$ mixer elements for combining the signals generated thereby to provide substantially complete cancellation of said converted local oscillator noise signal and an uncancelled intermediate frequency signal.

13. In combination with a source of signals to be heterodyned and a source of local oscillator signal, a heterodyne mixer circuit including four mixer elements, means for supplying said signals to be heterodyned to said four mixer elements equally and in phase, means included in said signal supplying means for reflecting an optimum impedance to said mixer elements at the frequency of generated image signals, means for supplying said local oscillator signal to said four mixer elements, said last-mentioned supplying means being arranged to cause the phase of the local oscillator signal at the second of said four mixer elements to differ in phase from the local oscillator signal at the first mixer element by $$\frac{a\pi}{2}$$

radians, where $a$ is an integer, said supplying means being further arranged to cause the phase difference between the local oscillator signals supplied to said second and third mixer elements and to said third and fourth mixer elements, respectively, to be equal to said phase difference of the local oscillator signals supplied to said first and second mixer elements, two of said mixer elements being so arranged as to introduce a phase shift of 180° of all the signals generated thereby and means for additively combining the outputs of said four mixer elements.

References Cited in the file of this patent

UNITED STATES PATENTS

| | | |
|---|---|---|
| 2,240,500 | Gabrilovitch | May 6, 1941 |
| 2,564,014 | Lanuza | Aug. 14, 1951 |

OTHER REFERENCES

Belles: Reduction of Heterodyne Interference-Electronics for December 1945, pp. 150–151.

UNITED STATES PATENT OFFICE
Certificate of Correction

Patent No. 2,828,411 March 25, 1958

Joseph T. Beardwood III et al.

It is hereby certified that error appears in the printed specification of the above numbered patent requiring correction and that the said Letters Patent should read as corrected below.

Column 2, line 3, for "portion of energy" read —portion of the energy—; lines 5 and 28, for "oscilator", each occurrence, read —oscillator—; column 3, line 56, for "elements 22" read —elements 20—; line 64, for "element 22" read —element 24—; column 5, line 32, equation 6, for "$2m$" read —$2m\pi$—; line 58, equation 9*b*, following the minus sign insert an opening parenthesis; line 74, for "oscallator" read —oscillator—; column 6, line 5, equation 12, for "$-2\psi=\psi^{+}-2a\pi$" read — $-2\psi=\psi\pm2a\pi$ —; lines 15 and 16, for "frequently" read —frequency—; line 62, for "returning" read —retuning—; column 9, line 56, for "cancallation" read —cancellation—; column 10, line 5, before "orientation" insert —same—; column 12, line 36, after "guide" insert —section—.

Signed and sealed this 24th day of June 1958.

[SEAL]

Attest:
KARL H. AXLINE,
*Attesting Officer.*

ROBERT C. WATSON,
*Commissioner of Patents.*